(12) United States Patent
Sasanka

(10) Patent No.: US 10,379,827 B2
(45) Date of Patent: Aug. 13, 2019

(54) AUTOMATIC IDENTIFICATION AND GENERATION OF NON-TEMPORAL STORE AND LOAD OPERATIONS IN A DYNAMIC OPTIMIZATION ENVIRONMENT

(71) Applicant: Intel Corporation, Santa Clara, CA (US)

(72) Inventor: Ruchira Sasanka, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 15/393,931

(22) Filed: Dec. 29, 2016

(65) Prior Publication Data
US 2018/0189040 A1  Jul. 5, 2018

(51) Int. Cl.
*G06F 8/41* (2018.01)
*G06F 9/30* (2018.01)
(Continued)

(52) U.S. Cl.
CPC ........ *G06F 8/4442* (2013.01); *G06F 9/30043* (2013.01); *G06F 9/45516* (2013.01); *G06F 11/34* (2013.01)

(58) Field of Classification Search
CPC ....... G06F 8/443–4442; G06F 9/45516; G06F 11/34; G06F 11/3466; G06F 11/3476;
(Continued)

(56) References Cited

U.S. PATENT DOCUMENTS 3,702,005 A * 10/1972 Ingalls, Jr. .......... G06F 11/3447
714/38.12
5,987,250 A * 11/1999 Subrahmanyam .. G06F 11/3466
714/E11.2
(Continued)

OTHER PUBLICATIONS

Kobalicek, P., mmx optimization for interpolation of two colors, Anti-Grain Geometry, Sep. 5, 2007, 10 pages, [retrieved on May 11, 2018], Retrieved from the Internet: <URL:http://thread.gmane.org/gmane.comp.graphics.agg/3769>.*
(Continued)

*Primary Examiner* — Geoffrey R St Leger
(74) *Attorney, Agent, or Firm* — Trop, Pruner & Hu, P.C.

(57) ABSTRACT

Techniques are disclosed to identify a frequently-executed region of code during runtime execution of the code, generate initial profiling code for the frequently-executed region of code, cause the initial profiling code to be executed for a minimum number of processing cycles of the computer, and identify replacement candidate store instruction(s) that store a value that is not read by the frequently-executed region of code during execution of the initial profiling code. Replacement candidate load instruction(s) may also be identified that load a value that is not stored or loaded by the frequently-executed region of code during execution of the initial profiling code. Optimized code for the frequently-executed region of code may be generated by replacing each of the replacement candidate store or load instructions(s) with a non-temporal store or load instruction. The optimized code may be executed instead of the frequently-executed region of code during subsequent runtime execution.

19 Claims, 8 Drawing Sheets

```
Function RecordStore (addr, StoreID) {
        Index = hash(addr)     /311       // hashes addr to a unique index  }
        Data[index] = StoreID  \312       // Stores StoreID at Data [Index]  } 310
}

Function LookupLoad (addr) {
        index = hash(addr)     /321       // get index for address
        store_id = Data [index] \322      // check for a previous store
        if (store_id != 0) {   /323       // if there is a previous store      } 320
                UsefulStores [store_id] = 1 \324   // make note of the store
}
         Profiling Helper Functions
```

300

(51) Int. Cl.
*G06F 11/34* (2006.01)
*G06F 9/455* (2018.01)

(58) Field of Classification Search
CPC ............. G06F 11/3636; G06F 11/3644; G06F 2201/865; G06F 12/0802; G06F 9/30043
USPC .................................................. 717/151–158
See application file for complete search history.

(56) References Cited

U.S. PATENT DOCUMENTS

| | | | |
|---|---|---|---|
| 6,542,966 B1 | 4/2003 | Crawford et al. | |
| 7,275,246 B1* | 9/2007 | Yates, Jr. ............ | G06F 9/45554 718/1 |
| 7,945,752 B1* | 5/2011 | Miller ................... | G06F 3/0611 711/114 |
| 8,898,648 B2* | 11/2014 | Chung ................ | G06F 11/3624 712/12 |
| 2002/0007441 A1 | 1/2002 | Palanca et al. | |
| 2003/0204840 A1* | 10/2003 | Wu ...................... | G06F 11/3612 717/158 |
| 2004/0263519 A1* | 12/2004 | Andrews ............ | G06F 15/7846 345/502 |
| 2005/0149915 A1* | 7/2005 | Wu ..................... | G06F 9/45516 717/137 |
| 2006/0059476 A1* | 3/2006 | McIntosh .............. | G06F 8/4435 717/155 |
| 2006/0206886 A1 | 9/2006 | Wu et al. | |
| 2010/0115240 A1* | 5/2010 | Falik .................. | G06F 9/30032 712/210 |
| 2011/0145551 A1 | 6/2011 | Wang et al. | |
| 2015/0339132 A1* | 11/2015 | Chen ...................... | G06F 9/448 713/100 |
| 2016/0034401 A1 | 2/2016 | Serebrin et al. | |
| 2017/0371660 A1* | 12/2017 | Smith ................. | G06F 9/30043 |

OTHER PUBLICATIONS

Hundt, R., et al., MAO—An extensible micro-architectural optimizer, Proceedings of the 9th Annual IEEE/ACM International Symposium on Code Generation and Optimization, 2011, pp. 1-10, [retrieved on May 12, 2018], Retrieved from the Internet: <URL:http://dl.acm.org/>.*

Defintion of "Cycle", FOLDOC, 2012, 1 page, [retrieved on Sep. 21, 2018], Retrieved from the Internet: <URL:https://web.archive.org/web/20120731121127/http://foldoc.org/cycle>.*

Kim, S., et al., Exploiting temporal loads for low latency and high bandwidth memory, IEE Proceedings—Computers and Digital Techniques, vol. 152, Issue: 4 , Jul. 8, 2005, pp. 457-466, [retrieved on Apr. 1, 2019], Retrieved from the Internet: <URL:http://ieeexplore.ieee.org/>.*

Gummaraju, J, et al., Stream Programming on General-Purpose Processors, Proceedings of the 38th annual IEEE/ACM International Symposium on Microarchitecture, Nov. 12-16, 2005, pp. 343-354, [retrieved on Apr. 1, 2019], Retrieved from the Internet: <URL:http://dl.acm.org/>.*

Intel, "Intel 64 and IA-32 Architectures Software Developer's Manual", Sep. 2016, Cover Page and pages vol. 2B 4-93 through 4-101, vol. 2: Instruction Set Reference, A-Z.

International Searching Authority, "Notification of Transmittal of the International Search Report and the Written Opinion of the International Searching Authority," dated Feb. 12, 2018, in International application No. PCT/US2017/061705.

* cited by examiner

```
...
Store Addr, Data  ~211        // normal store instruction   ⎫
RecordStore (addr, StoreID);                                ⎬ 210
                  ~212                                      ⎭
...
Load Addr, Reg  ~221                                        ⎫
lookupLoad(addr)                // normal load instruction  ⎬ 220
                ~222                                        ⎭
...
```

Initial profiling code

FIG. 2

```
Function RecordStore (addr, StoreID) {                      ⎫
    Index = hash(addr)  ~311    // hashes addr to a unique index
    Data[index] = StoreID ~312  // Stores StoreID at Data [Index]  ⎬ 310
}                                                           ⎭

Function LookupLoad (addr) {                                ⎫
    index = hash(addr)  ~321    // get index for address
    store_id = Data [index] ~322 // check for a previous store
    if (store_id != 0) { ~323   // if there is a previous store  ⎬ 320
        UsefulStores [store_id] = 1 ~324 // make note of the store
}                                                           ⎭
```

Profiling Helper Functions

```
Function LookupLoad (addr, LoadID) {

Index = hash(addr)    ~611           // get index for address          ⎫
    stld_id = Data[index] ~612           // check for a prev store/load    ⎬ 610
                                                                           ⎭ if (stld_id != 0) {          ~631    // if there is a prev store/load  ─── 620
        if (isLoad (stld_id))             // if stld_id is a load id        ⎫
            UsefulLoads [stld_id] = 1 ~632 // prev load is temporal          ⎬ 630
                                                                            ⎭
        UsefulLoads[LoadID] = 1          // Cur load is also temporal  ─── 640
    }

Data [Index] = LoadID                // record current load  ─── 650

AUTOMATIC IDENTIFICATION AND GENERATION OF NON-TEMPORAL STORE AND LOAD OPERATIONS IN A DYNAMIC OPTIMIZATION ENVIRONMENT

TECHNICAL FIELD

Techniques are disclosed that pertain to computer cache memory and dynamic code generation at runtime.

BACKGROUND

The use of a cache memory with a processor facilitates the reduction of memory access time. Hardware implements cache as a block of memory for temporary storage of data likely to be used again. Central processing units (CPUs) and hard disk drives (HDDs) frequently use a cache, as do web browsers and web servers. A cache is made up of a pool of entries. Each entry has associated data, which is a copy of the same data in a backing store. Each entry also has a tag, which specifies the identity of the data in the backing store of which the entry is a copy. When the cache client (a CPU, web browser, operating system) needs to access data presumed to exist in the backing store, the cache client first checks the cache.

The fundamental idea of cache organization is that by keeping the most frequently accessed instructions and data in the fast cache memory, the average memory access time will approach the access time of the cache. To achieve the maximum possible speed of operation, typical processors implement a cache hierarchy, that is, different levels of cache memory. The different levels of cache correspond to different distances from the processor core. The closer the cache is to the processor, the faster the data access. However, the faster the data access, the more costly it is to store data. As a result, the closer the cache level, the faster and smaller the cache.

The performance of cache memory is frequently measured in terms of its hit ratio. When the processor accesses memory and finds the requested data in cache, a cache hit is said to have occurred. If the requested data is not found in cache, then the data is in main memory and a cache miss has occurred. If a miss occurs, then an allocation is made at the entry indexed by the access. The access can be for loading data to the processor or storing data from the processor to memory. The cached information is retained by the cache memory until it is no longer needed, made invalid or replaced by other data, in which instances the cache entry is de-allocated.

The type of data that is typically stored in cache includes active portions of programs and data. Certain instructions, however, are used infrequently. Locality of reference is a term for the situation in which the same values, or related storage locations, are frequently accessed, depending on the memory access pattern. Temporal locality refers to the reuse of specific data, and/or resources, within a relatively-small time duration. Systems that exhibit strong temporal locality are candidates for performance optimization through the use of techniques such as caching. On the other hand, instructions that do not exhibit temporal locality provide no benefit by being written to cache. Since non-temporal instructions are used infrequently, optimal performance dictates that the cached application code and data not be overwritten by this infrequently used data.

BRIEF DESCRIPTION OF THE DRAWINGS

FIG. 2 is an example of initial profiling code generated in accordance with an embodiment.

FIG. 3 is an example of code for profiling helper functions used in generating the initial profiling code of FIG. 2.

FIG. 6 is an example of alternative code for the LookupLoad profiling helper function used in generating the initial profiling code of FIG. 2.

DETAILED DESCRIPTION

Figure 1B:
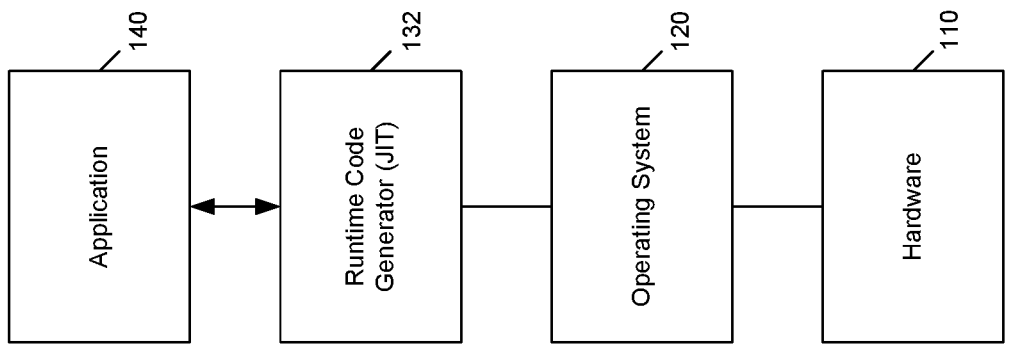
FIG. 1B is a block diagram of another computing environment in which embodiments may be used.

Normal memory store operations read a full cache line first and then modify the cached data. In some situations, however, a memory store operation pushes data out of the caches which might be needed again in favor of data which will not be used soon. This situation can happen with large data structures, like matrices, which are filled and then used later. Before the last element of the matrix is filled, the large amount of data written to cache evicts the first elements of the data structure, making caching of the writes ineffective.

For this large matrix loading and similar situations, some processors provide support for non-temporal write operations. Non-temporal in this context means the data will not be reused soon, so there is no reason to cache the data. These non-temporal write operations do not read a cache line and then modify it; instead, the new content is directly written to memory.

In some Intel processors, non-temporal load/store instructions are called movnt* (with the suffix according to data type, for e.g. movnti for loading normal integers to general purpose registers). Non-temporal instructions for streaming loads/stores are also provided and use a similar technique for high bandwidth streams (when full cache lines are loaded consecutively). To use these non-temporal instructions, typically the programmer uses compiler directives to indicate that instructions generated should be non-temporal instructions.

Techniques are disclosed herein to identify a frequently-executed region of code during runtime execution of the code, generate initial profiling code for the frequently-executed region of code, cause the initial profiling code to be executed for a minimum number of processing cycles of the computer, and identify replacement candidate store instruction(s) that store a value that is not read by the frequently-executed region of code during execution of the initial profiling code. Replacement candidate load instruction(s) may also be identified that load a value that is not stored or loaded by the frequently-executed region of code during execution of the initial profiling code. Optimized code for the frequently-executed region of code may be generated by replacing each of the replacement candidate store or load instructions(s) with a non-temporal store or load instruction.

The optimized code may be executed instead of the frequently-executed region of code during subsequent runtime execution.

Embodiments automatically identify memory store and load instructions that are not likely to benefit from caching. In some embodiments, Just-in-Time (JIT) compilation technology generates optimized code that uses non-temporal store/load instructions for those stores/loads that would not benefit from caching. By reducing cache pollution, higher cache hit rates lead to higher performance and energy efficiency.

Embodiments automatically detect non-temporal store and load operations without programmer involvement (e.g., there is no need for the programmer to insert compiler directives to use non-temporal store and load instructions). Embodiments are useful within multiple environments such JIT compilers, profile-guided compilers, binary translators, etc.

Rather than programmer-supplied compiler directives, profile-guided optimization uses the results of profiling test runs of the instrumented program to optimize the final generated code. The compiler is used to access data from a sample run of the program across a representative input data set. The results indicate which areas of the program are executed more frequently, and which areas are executed less frequently. Optimizations benefit from profile-guided feedback because compilation decisions are made without relying on heuristics or programmer-provided directives. The sample of data fed to the program during the profiling state should be statistically representative of the typical usage scenarios.

Just-in-time (JIT) compilation can make use of runtime information to dynamically recompile parts of the executed code to generate more efficient native code. If the dynamic profile changes during execution, the JIT compiler can generate new code optimized with the information from the new profile.

Figure 1A:
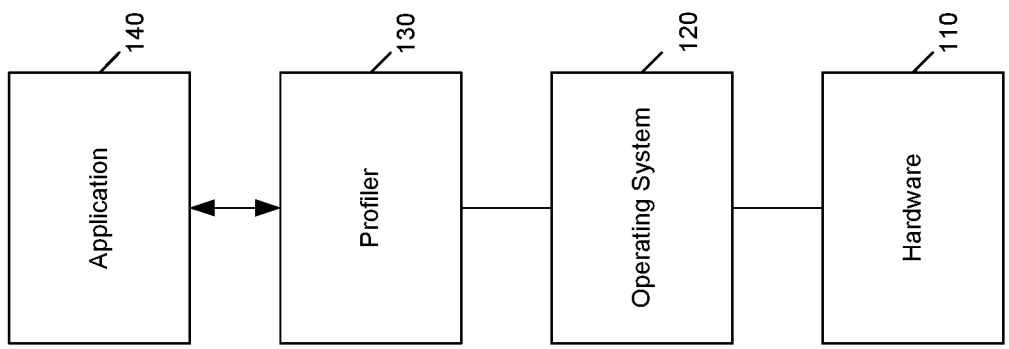
FIG. 1A is a block diagram of a computing environment in which embodiments may be used.

FIG. 1A is a block diagram of a computing environment in which embodiments may be used. Hardware 110 represents the hardware of a computing device, such as processors, memories, Input/Output devices, and so on. Operating system 120 is system software that manages computer hardware and software resources and provides common services for computer programs. For hardware functions such as input and output and memory allocation, operating system 120 acts as an intermediary between application programs, such as application 140, and the computer hardware 110.

Profiler 130 detects store and load instructions that will not benefit from being cached and that can be replaced with non-temporal store and load instructions. In one embodiment, profiler 130 reports the identified store and load instructions to a programmer of application 140 so that the programmer can replace the identified store and load instructions with non-temporal store and load instructions. In one embodiment, profiler 130 is part of a standard compiler that performs profile-guided optimization. In another embodiment, profiler 130 can be part of an advising tool, such as Intel® Advisor™, which a programmer of application 140 uses to analyze application 140 code for opportunities to optimize application 140 code.

FIG. 1B is a block diagram of another computing environment in which embodiments may be used. In one embodiment, runtime code generator (JIT) 132 performs just-in-time (JIT) compilation of application 140 during execution of application 140 at run time, rather than prior to execution. JIT compilation typically translates code written in a high-level language to machine code, which is then executed directly, but can also refer to translation to another format. A system implementing a JIT compiler typically continuously analyzes the code being executed and identifies parts of the code where the performance gain achieved by compilation outweighs the overhead of compiling that code.

Dynamic binary optimization performed by runtime code generator (JIT) 130 takes advantage of information discovered at runtime to improve the performance of binary code, such as application 140. Runtime optimizations may include reordering code, eliminating dead code, and otherwise streamlining the original binary code. In one embodiment, streamlining the original binary code of application 140 involves identifying static store and load instructions that will not benefit from being cached and replacing the identified static store and load instructions with non-temporal store and load instructions.

FIG. 2 is an example of initial profiling code generated in accordance with an embodiment. The initial profiling code 200 may be generated by profiler 130 of FIG. 1A or runtime code generator 132 of FIG. 1B. The description herein uses runtime code generator (JIT) 132 as the generator of the initial profiling code 200, although initial profiling code 200 may also be generated by profiler 130 or other run-time code generators.

Initial profiling code 200 is generated for a "hot region" of code, which is a region of code that is frequently or repeatedly executed. Initially, runtime code generator (JIT) 132 generates profiling code 200 for a hot region R, as shown in code segments 210 and 220. In the example shown in FIG. 2, runtime code generator (JIT) 132 generates profiling code 200 such that every static store instruction of the hot region, such as store instruction 211, is followed by a call to a function called RecordStore( ), as shown in RecordStore instruction 212. The call to RecordStore instruction 212 passes the address into which data are stored by store instruction 211, as well as a StoreID identifier for the store instruction 211. In one embodiment, the StoreID identifier for each static store instruction is assigned by the runtime code generator (JIT) 132 and passed as a parameter to the RecordStore function. If runtime code generator (JIT) 132 executes a loop, when a static store instruction is executed, the StoreID passed to the RecordStore function is the same static store instruction identifier (StoreID value) for each iteration of the loop.

Similarly, every static load instruction of the hot region, such as load instruction 221, is followed by a call to a function called LookupLoad( ), as shown in LookupLoad instruction 222. The call to LookupLoad instruction 222 passes the address being loaded by the load instruction 221, as well as a LoadID identifier for the static load instruction 221. In one embodiment, the LoadID identifier for each static load instruction is assigned by the runtime code generator (JIT) 132 and passed as a parameter to the LookupLoad function. If runtime code generator (JIT) 132 executes a loop, when a static load instruction is executed, the LoadID passed to the LookupLoad function is the same static load instruction identifier (LoadID value) for each iteration of the loop.

FIG. 3 is an example of code for profiling helper functions used in generating the initial profiling code of FIG. 2. Code segment 310 includes example code for the RecordStore function, and code segment 320 includes example code for the LookupLoad function. The RecordStore and LookupLoad( ) functions use two arrays, named Data[ ] and UsefulStores[ ], which are initialized to zero before profiling starts.

At code element 311, the address passed to the RecordStore function is used to create an index into the Data array, which is used to store address information for each store instruction (each store instruction being identified by a StoreID). In the example shown in code element 311, a hash function is applied to the address passed to the RecordStore function to create an index into the Data array, where hash( ) returns a unique location in the Data array from 0 . . . M (the size of the Data array). In one embodiment, a hash function is used that is similar to a hash algorithm used by a hardware cache to determine the set ("row") of a cache (using a subset of bits in the address). One of skill in the art will recognize that other types of functions can be used to produce a unique index into the Data array corresponding to a given address.

At code element 312, the StoreID for the store instruction being recorded (i.e., Store instruction 211 of FIG. 2) is saved into the Data array at a position designated by the index calculated in code element 311. After all store operations have been processed, the Data array contains a StoreID for a store instruction that has been issued for each address in which data have been stored. After the addresses to which store operations have been issued are identified in the Data array, information about load operations is used to determine which of the addresses from which data have been read.

Code segment 320 includes example code for the LookupLoad function, which not only records identification information for each load instruction, but also identifies addresses for which a previous store instruction has occurred. At code element 321, the index into the Data array is determined from the address passed to the LookupLoad instruction (i.e., the address being loaded in the load instruction 221 of FIG. 2). In the example code of code element 321, the same hash function previously used at code element 311 is used so that the same index/hashed value will be produced from a given address. As with code element 311, any function can be used to produce a unique index into the Data array corresponding to a given address, as long as the same function is used to determine the index for both RecordStore and LookupLoad instructions. At code element 322, the store_ID value stored in the Data array at the index determined by code element 321 is identified. At code element 323, if the store_ID value stored in the Data area at the index determined by code element 321 is not zero, a previous store operation has occurred at the address referenced by the index calculated at code element 311. Control proceeds to code element 324, where the StoreID is marked as a useful store instruction in the UsefulStores array. Useful store instructions are instructions that write data to an address that is subsequently read by a load instruction in the same frequently-executed region of code R.

Note that a store or load instruction can access multiple bytes or words. In one embodiment, StoreID is recorded for each byte or word that a given store instruction writes. Similarly, a load instruction is looked up for each byte or word that the load instruction reads. For this embodiment, an additional argument identifying the "number of bytes/words" may be passed as a parameter for both of the RecordStore and LookupLoad functions. This additional argument will convey the number of bytes/words written/read by a given store or load instruction.

In summary, the profiling helper functions RecordStore and LookupLoad are used as follows. The function RecordStore( ) is used to associate an identifier, StoreID, with the address written by the store instruction. If a given store operation S modifies memory location X, and then a later load L reads the same location X, function LookupLoad( ) will find S at location X in the Data array. S is marked in array UsefulStores to indicate that store S produces data that will be used again.

After a hot region of code R is executed many times (such as for one million dynamic instructions or cycles), all temporal store operations have been marked in the UsefulStores array. Any store instruction that is not in the UsefulStores array is a store instruction that is a candidate for converting to a non-temporal store instruction.

Figure 4:
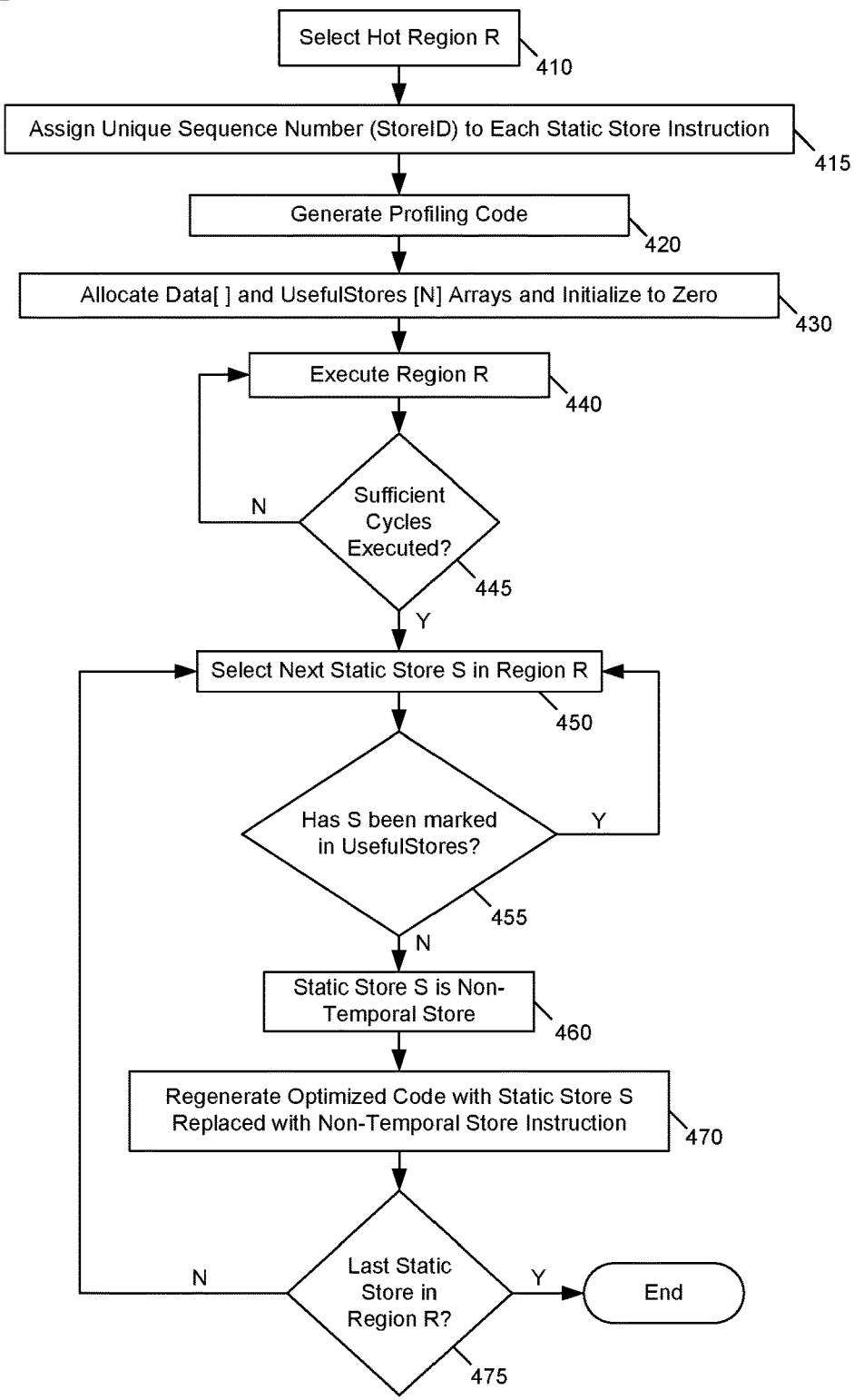
FIG. 4 is a flowchart of a method for identifying non-temporal store instructions and generating optimized code in accordance with an embodiment.

FIG. 4 is a flowchart of a method 400 for identifying non-temporal store instructions and generating optimized code in accordance with an embodiment. At "Select Hot Region R" block 410, a frequently-accessed ("hot") region of code is selected for optimization. In one embodiment, the hot region R is identified by finding the most frequently executed basic block, or most frequently executed backward branch instruction, etc. of the code being executed. The most frequently executed block or instruction serves as a starting point of the hot region. Additional profiling may then be performed for another large number (such as one million) of dynamic (executed) instructions. These executed instructions will also be identified as belonging to the "hot" region.

From "Select Hot Region R" block 410, control passes to "Assign Unique Sequence Number (StoreID) to Each Static Store Instruction" block 415. At block 415, a unique sequence number (StoreID, with values from 0 . . . N, where N is the number of static store instructions in Region R) is assigned to every static store instruction within the selected hot region R. At "Generate Profiling Code" block 420, initial profiling code is generated for the instructions in the selected hot region R. In generating the initial profiling code, each store instruction in hot region R is followed by a call to a RecordStore function, and each load instruction is followed by a call to a LookupLoad function, as previously described with reference to FIG. 2. Generating the initial profiling code is described in further detail with reference to FIG. 5.

Referring back to FIG. 4, at "Allocate Data[ ] and UsefulStores[N] arrays and Initialize to Zero" block 430, the Data and UsefulStores arrays used by the profiling helper functions of FIG. 3 are allocated and initialized to zero. Control proceeds to "Execute Region R" block 440, where the hot region R is executed. Hot region R is executed a sufficient number of times (e.g., 1M cycles) to thoroughly analyze the store and load instructions contained therein. At "Sufficient Cycles Executed?" decision point 445, a determination is made whether a sufficient number of cycles have been executed to thoroughly analyze the store and load instructions contained within hot region R. If not, control returns to "Execute Region R" block 440, where another cycle of hot region R is executed. If a sufficient number of cycles have been executed at "Sufficient Cycles Executed?" decision point 445, control proceeds to "Select Next Static Store S in Region R" block 450.

At "Select Next Static Store S in Region R" block 450, initially the first static store instruction S is selected in hot region R. Control proceeds to "Has S Been Marked in UsefulStores?" decision point 455, where a determination is made whether the selected static store instruction S has been marked as a useful store instruction. If so, control returns to "Select Next Static Store S in Region R" block 450 and the next static store instruction is selected.

At "Has S Been Marked in UsefulStores?" decision point 455, if the selected store instruction S has not been marked as a useful store instruction, control proceeds to "Static Store S is Non-Temporal Store" block 460. Classifying a store instruction S as a non-temporal store instruction indicates that S produces a value that is never read within region R.

As such, there is no reason to write the value stored by store instruction S to cache. Control proceeds to "Regenerate Optimized Code with Static Store S Replaced with Non-Temporal Store Instruction" block 470, where the static store instruction S is replaced with a non-temporal store instruction, such as the mount instruction provided by some Intel® processors, as described above. Note that the optimized code may not include calls to the RecordStore and LookupLoad profiling helper functions used to analyze the store and load instructions in hot region R, as the profiling helper functions are only needed during the determination of whether a given store or load instruction is a non-temporal instruction.

From "Regenerate Optimized Code with Static Store S Replaced with Non-Temporal Store Instruction" block 470, control proceeds to "Last Static Store in Region R?" decision point 475. If the last static store instruction has been processed, method 400 ends. If the last static store instruction has not been processed, control returns to "Select Next Static Store Sin Region R" block 450, where the next static store instruction is selected for processing.

Figure 5:
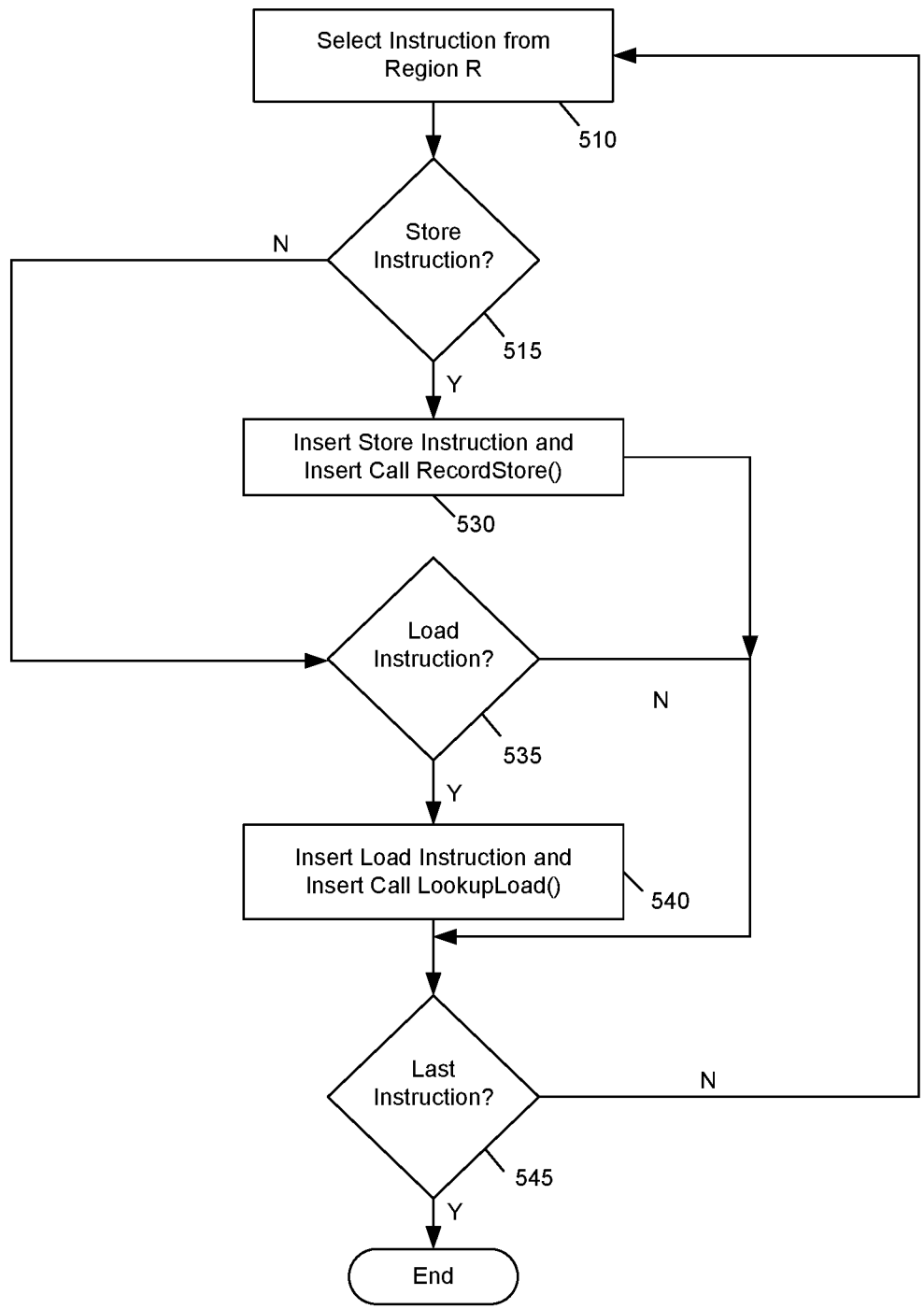
FIG. 5 is a flowchart of a method for generating the initial profiling code of FIG. 2.

FIG. 5 is a flowchart of a method 420 for generating the initial profiling code of FIG. 2. Method 420 corresponds to the "Generate Profiling Code" block 420 of FIG. 4. At "Select Instruction from Region R," block 510, an instruction from hot Region R is selected for analysis. In one embodiment, each instruction of region R is considered in sequential order. Control proceeds to "Store Instruction?" decision point 515, where a determination is made whether the selected instruction is a store instruction. If so, control proceeds to "Insert Store Instruction and Insert Call RecordStore( )" block 530, where the store instruction and an instruction to call the RecordStore function of FIG. 3 are inserted into the profiling code.

At "Store Instruction?" decision point 515, if the instruction is not a store instruction, control proceeds to "Load Instruction?" decision point 535, where a determination is made whether the selected instruction is a load instruction. If so, control proceeds to "Insert Load instruction and Insert Call LookupLoad( )" block 540, where the load instruction and an instruction to call the LookupLoad function of FIG. 3 are inserted into the profiling code.

At "Load Instruction?" decision point 535, if the instruction is not a load instruction, control proceeds to "Last Instruction?" decision point 545, where a determination is made whether the selected instruction is the last instruction in region R. If so, method 420 ends. If not, control returns to "Select Instruction from Region R" block 510, where the next instruction in hot region R is selected for analysis.

FIG. 6 is an example of alternative code for the LookupLoad profiling helper function used in generating the initial profiling code of FIG. 2. This version of the LookupLoad function determines whether a load instruction is a temporal load instruction and, if not, marks the load instruction as a candidate for replacement by a non-temporal load instruction.

Code segment 610 determines whether a store or load instruction has been executed for the address passed as a parameter to the LookupLoad function. At code element 611, the address passed to the LookupLoad function is used to create an index into the Data array, which is used to store data for each store instruction (with each store instruction being identified by a StoreID) and each load instruction (with each load instruction being identified by a LoadID). In the example shown in code element 611, a hash function is applied to the address passed to the LookupLoad function to create an index into the Data array, where hash( ) returns a unique location in the Data array from 0 . . . M (the size of the Data array). In one embodiment, a hash function is used that is similar to a hash algorithm used by a hardware cache to determine the set ("row") of a cache (using a subset of bits in the address). One of skill in the art will recognize that other types of functions can be used to produce a unique index into the Data array corresponding to a given address.

At code element 612, a variable stld_ID is set to the value stored in the Data array at the position determined by the index calculated at code element 611. If either a store instruction or a load instruction has been executed for the address passed to the LookupLoad function, the respective StoreID or LoadID will be stored in the Data array. After all load and store operations have been processed, the Data array contains a StoreID or LoadID for each instruction that has been issued for each address in which data have been stored or read.

Code element 620 determines whether a previous store or load instruction has been performed for the address passed to the LookupLoad function by checking whether the stld_ID value set at code element 612 is non-zero. If the stld_ID is non-zero, code segment 630 determines whether the previous instruction was a load instruction. Code element 631 checks whether the stld_ID value indicates that the previous instruction was a load instruction. If the previous instruction was a load instruction, at code element 632, the previous load instruction is marked in the UsefulLoads array indicating that the previous load is temporal (i.e., a useful load). Furthermore, at code element 640, the current load instruction identified by the LoadID parameter passed to the LookupLoad function is also marked as a useful load (i.e., a temporal load instruction). Finally, in code element 650, the LoadID for the current load instruction is saved in the Data array at the position indicated by the index calculated at code element 611.

At the end of the profiling phase, the array UsefulLoads[ ] contains all load instructions that exhibit temporal behavior (i.e., the same data is accessed more than once within the hot region). Other load instructions, which are non-temporal, can be converted to a non-temporal load instruction.

Figure 7:
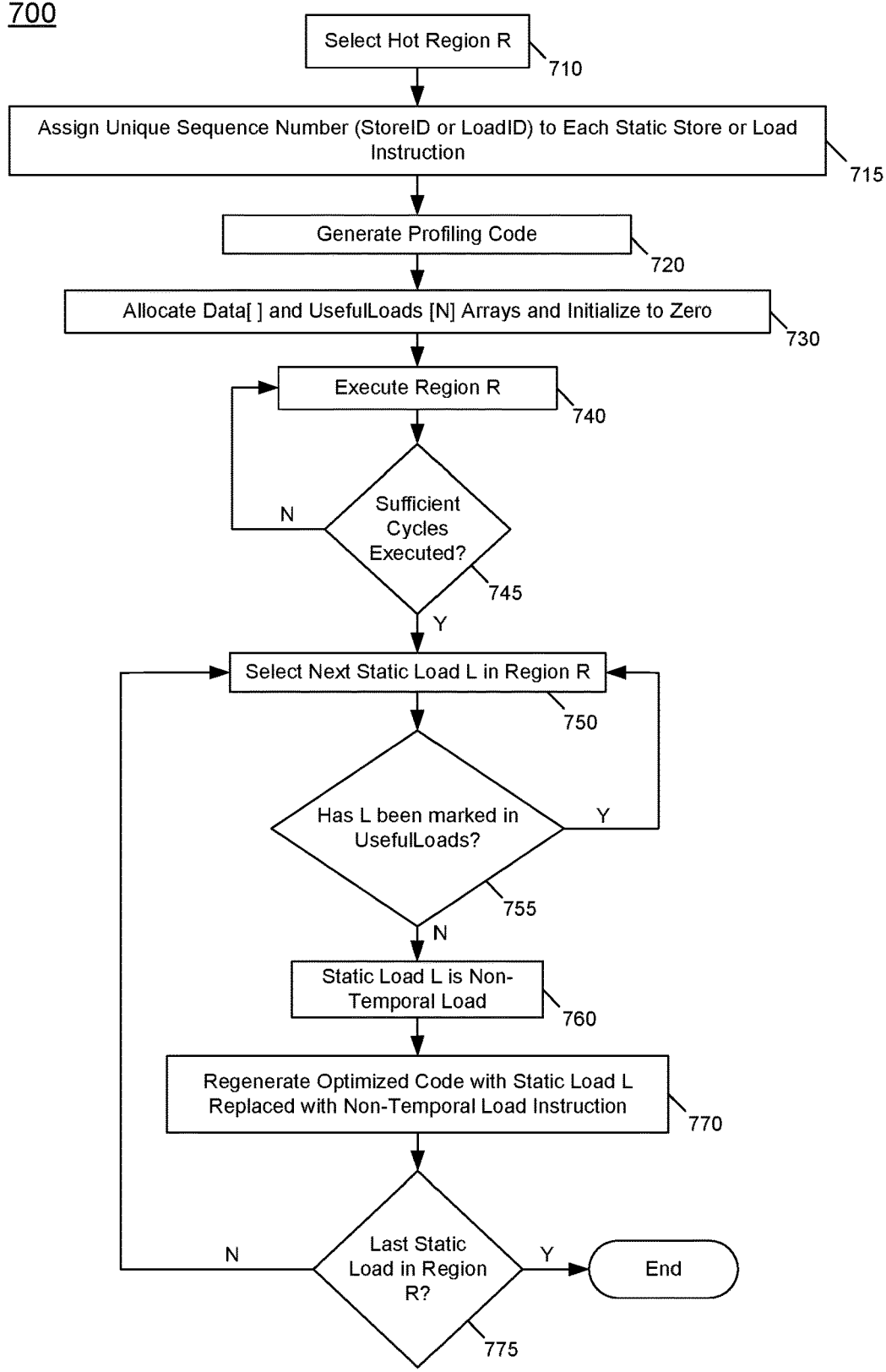
FIG. 7 is a flowchart of a method for identifying non-temporal load instructions and generating optimized code in accordance with an embodiment.

FIG. 7 is a flowchart of a method 700 for identifying non-temporal load instructions and generating optimized code in accordance with an embodiment. At "Select Hot Region R" block 710, a frequently-accessed ("hot") region of code is selected for optimization. At "Assign Unique Sequence Number (StoreID or LoadID) to Each Static Store or Load. Instruction" block 715, a unique sequence number (StoreID or LoadID, with values from 0 . . . N, where N is the number of static store or load instructions in Region R) is assigned to every static store or load instruction within the selected hot region R. At "Generate Profiling Code" block 720, initial profiling code is generated for the instructions in the selected hot region R. In generating the initial profiling code, each store instruction in hot region R is followed by a call to a RecordStore function, and each load instruction is followed by a call to a LookupLoad function, as previously described with reference to FIG. 2. Generating the initial profiling code was described in further detail with reference to FIG. 5.

Referring back to FIG. 7, at "Allocate Data[ ] and UsefulLoads[N] Arrays and Initialize to Zero" block 730, the Data and UsefulLoads arrays used by the profiling helper functions of FIGS. 3 and 6 are allocated and initialized to zero. Control proceeds to "Execute Region R" block 740, where the hot region R is executed. Hot region R is executed a sufficient number of times (e.g., one million cycles) to thoroughly analyze the store and load instructions contained therein. At "Sufficient Cycles Executed?" decision point 745, a determination is made whether a sufficient number of cycles have been executed to thoroughly analyze the store and load instructions contained within hot region R. If not, control returns to "Execute Region R" block 740, where another cycle of hot region. R is executed. If a sufficient number of cycles has been executed at "Sufficient Cycles Executed?" decision point 745, control proceeds to "Select Next Static Load L in Region R" block 750.

At "Select Next Static Load L in Region R" block 750, initially the first static load instruction L is selected in hot region R. Control proceeds to "Has L Been Marked in UsefulLoads?" decision point 755, where a determination is made whether the selected static load instruction L has been marked as a useful load instruction. If so, control returns to "Select Next Static Load L in Region R" block 750 and the next static load instruction is selected.

At "Has L Been Marked in UsefulLoads?" decision point 755, if the selected load instruction L has not been marked as a useful load instruction, control proceeds to "Static Load L is Non-Temporal Load" block 760. Classifying a load instruction L as a non-temporal load instruction indicates that L reads a value that is not used again (either loaded or stored) within region R. As such, there is no reason to write the value read by load instruction L to cache. Control proceeds to "Regenerate Optimized Code with Static Load L Replaced with Non-Temporal Load Instruction" block 770, where the static load instruction. L is replaced with a non-temporal load instruction, such as the movnt instruction provided by some Intel® processors, as described above. Note that the optimized code may net include calls to the RecordStore and LookupLoad profiling helper functions used to analyze the store and load instructions in hot region R, as the profiling helper functions are only needed during the determination of whether a given store or load instruction is a non-temporal instruction.

From "Regenerate Optimized Code with Static Load L Replaced with Non-Temporal Load Instruction" block 770, control proceeds to "Last Static Load in Region R?" decision point 775. If the last static load instruction has been processed, method 700 ends. If the last static load instruction has not been processed, control returns to "Select Next Static Load L in Region R" block 750, where the next static load instruction is selected for processing.

The methods disclosed in FIG. 4 for store instructions and FIG. 7 for load instructions can be combined into a single profiling phase, by maintaining separate Data[ ] arrays for store and load indexes.

Figure 8:
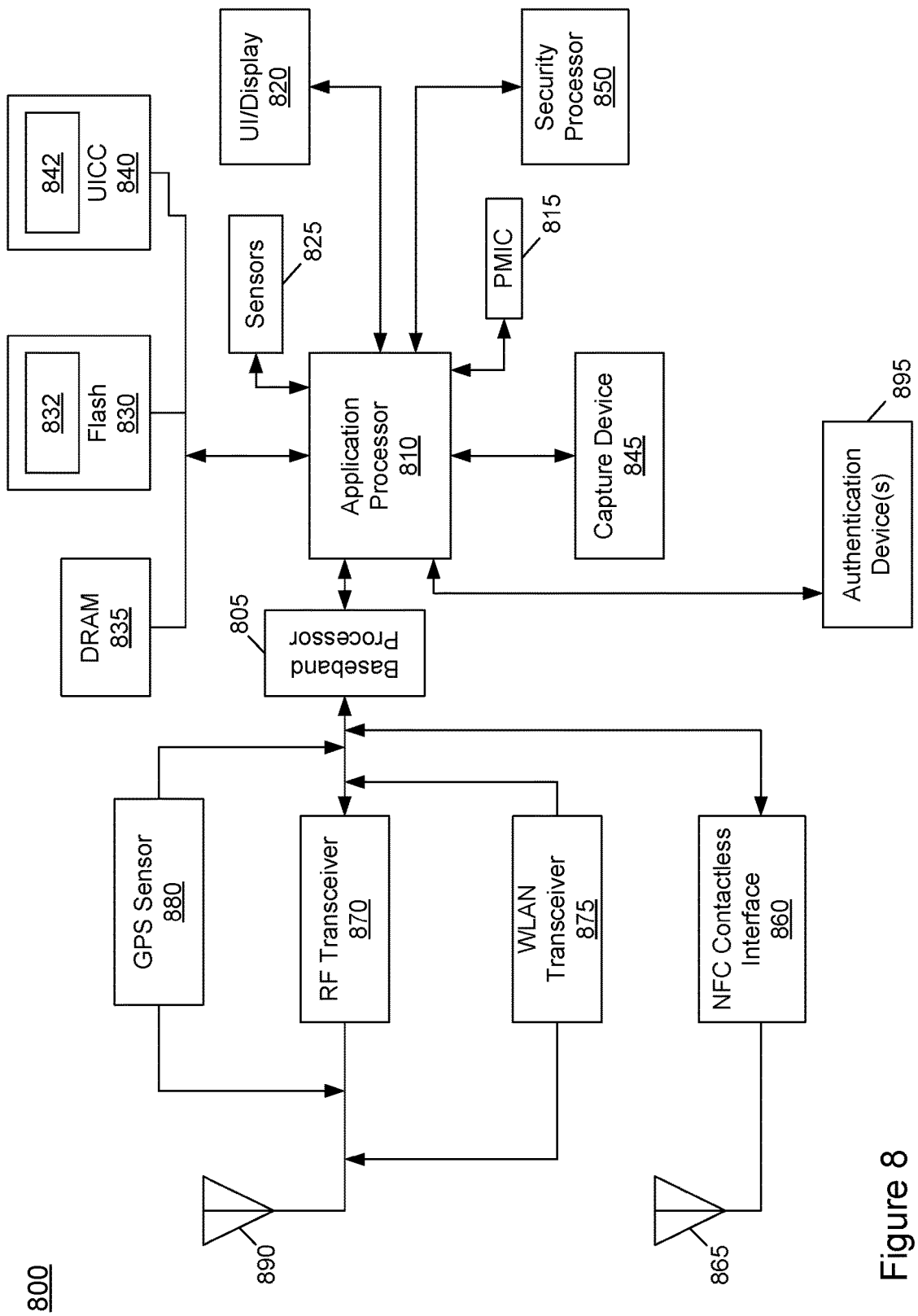
FIG. 8 is a block diagram of a computing device in which embodiments of the invention may be used.

Referring now to FIG. 8, shown is a block diagram of an example system with which embodiments can be used. As seen, system 800 may be a smartphone or other wireless communicator or any other IoT device. A baseband processor 805 is configured to perform various signal processing with regard to communication signals to be transmitted from or received by the system. In turn, baseband processor 805 is coupled to an application processor 810, which may be a main CPU of the system to execute an OS and other system software, in addition to user applications such as many well-known social media and multimedia apps. Application processor 810 may further be configured to perform a variety of other computing operations for the device, including the profiling and code optimization functions described herein.

In turn, application processor 810 can couple to a user interface/display 820, e.g., a touch screen display. In addition, application processor 810 may couple to a memory system including a non-volatile memory, namely a flash memory 830 and a system memory, namely a DRAM 835.

In some embodiments, flash memory 830 may include a secure portion 832 in which keys; other secrets and other sensitive information may be stored and operated. One or More of these storages may store a package for performing the profiling and code optimization functions described herein. As further seen, application processor 810 also couples to a capture device 845 such as one or more image capture devices that can record video and/or still images.

Still referring to FIG. 8, a universal integrated circuit card (UICC) 840 comprises a subscriber identity module, which in some embodiments includes a secure storage 842 to store secure identity information. System 800 may further include a security processor 850 that may that may implement a trusted execution environment (TEE), and which may couple to application processor 810. Furthermore, application processor 810 may implement a secure mode of operation, such as Intel® Software Guard Extensions (SGX) to a given instruction set architecture, and circuitry for hosting of a TEE. A plurality of sensors 825, including one or more multi-axis accelerometers may couple to application processor 810 to enable input of a variety of sensed information such as motion and other environmental information. In addition, one or more authentication devices 895 may be used to receive, e.g., user biometric input for use in authentication operations.

As further illustrated, a near field communication (NFC) contactless interface 860 is provided that communicates in a NFC near field via an NFC antenna 865. While separate antennae are shown in FIG. 8, understand that in some implementations one antenna or a different set of antennae may be provided to enable various wireless functionality.

A power management integrated circuit (PMIC) 815 couples to application processor 810 to perform platform level power management. To this end, PMIC 815 may issue power management requests to application processor 810 to enter certain low power states as desired. Furthermore, based on platform constraints, PMIC 815 may also control the power level of other components of system 800.

To enable communications to be transmitted and received such as in one or more IoT networks, various circuitry may be coupled between baseband processor 805 and an antenna 890. Specifically, a radio frequency (RF) transceiver 870 and a wireless local area network (WLAN) transceiver 875 may be present. In general, RF transceiver 870 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 880 may be present, with location information being provided to security processor 850, which may be used in certain security operations. Other wireless communications such as receipt or transmission of radio signals, e.g., AM/FM and other signals may also be provided. In addition, via WLAN transceiver 875, local wireless communications, such as according to a Bluetooth™ or IEEE 802.11 standard can also be realized.

Figure 9:
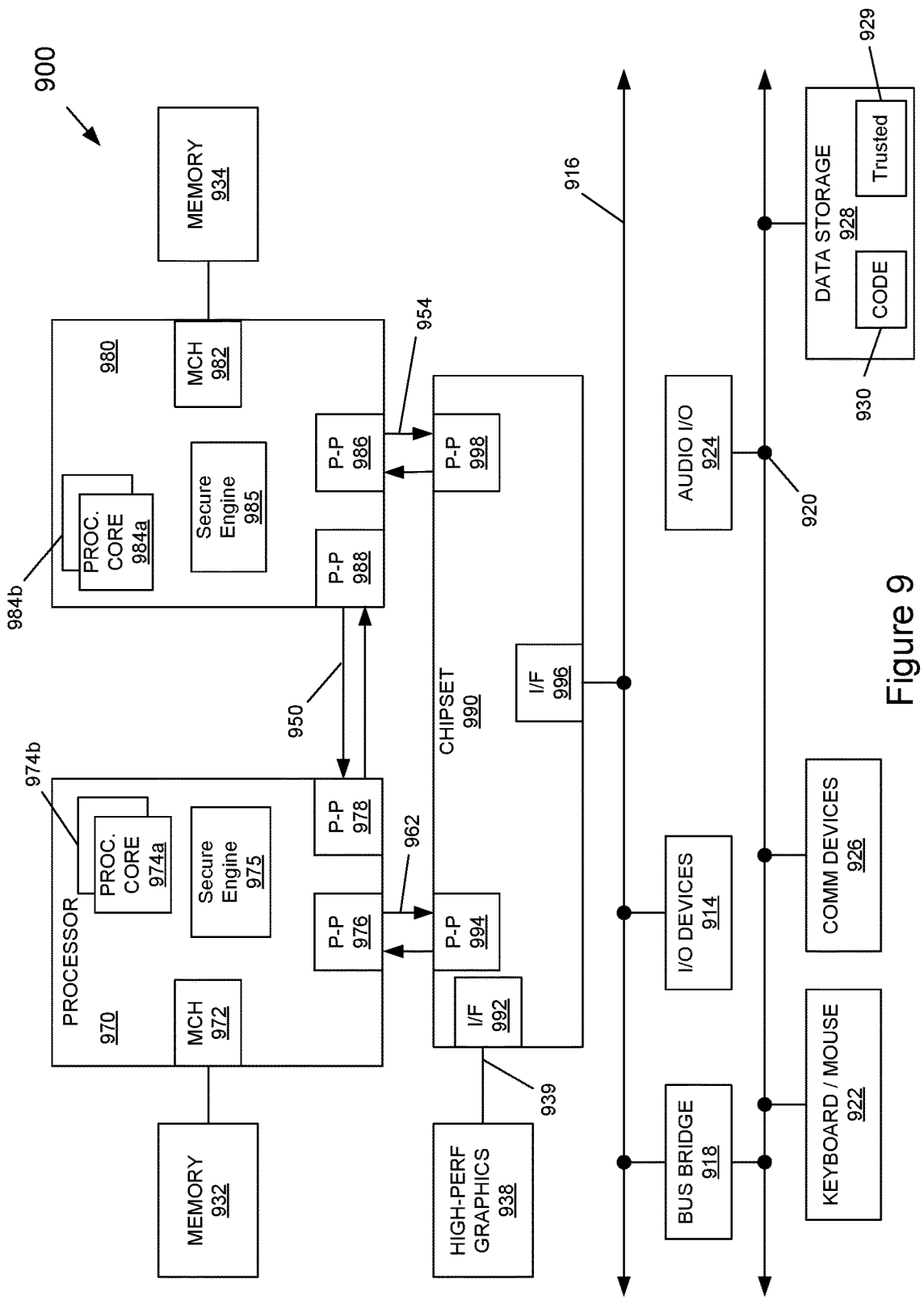
FIG. 9 is a block diagram of a computing device in which embodiments of the invention may be used.

Referring now to FIG. 9, shown is a block diagram of a system in accordance with another embodiment of the present invention. As shown in FIG. 9, multiprocessor system 900 can be configured to implement the profiling and code optimization functions described herein and may be implemented as a point-to-point interconnect system such as a server system. System 900 includes a first processor 970 and a second processor 980 coupled via a point-to-point interconnect 950. As shown in FIG. 11, each of processors 970 and 980 may be multicore processors such as SoCs, including first and second processor cores (i.e., processor cores 974a and 974b and processor cores 984a and 984b), although potentially many more cores may be present in the processors. In addition; processors 970 and 980 each may include a secure engine 975 and 985 to perform the profiling and code optimization functions as described herein.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. MCH's 972 and 982 couple the processors to respective memories, namely a memory 932 and a memory 934, which may be portions of main memory (e.g., a DRAM) locally attached to the respective processors. First processor 970 and second processor 980 may be coupled to a chipset 990 via P-P interconnects 952 and 954, respectively. As shown in FIG. 9, chipset 990 includes P-P interfaces 994 and 998.

Furthermore, chipset 990 includes an interface 992 to couple chipset 990 with a high performance graphics engine 938, by a P-P interconnect 939. In turn, chipset 990 may be coupled to a first bus 916 via an interface 996. Various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a non-volatile storage or other mass storage device. As seen, data storage unit 928 may include code 930, in one embodiment, including code for performing the profiling and code optimization functions described herein. As further seen, data storage unit 928 also includes a trusted storage 929 to store sensitive information to be protected. Further, an audio I/O 924 may be coupled to second bus 920.

The following Examples pertain to further embodiments.

In Example 1, a system to identify and replace store and load instructions that will not benefit from caching is provided. The system may include a processor; a memory coupled to the processor; and a profiler to: identify a frequently-executed region of code during runtime execution of the code by the processor; generate initial profiling code for the frequently-executed region of code; cause the initial profiling code to execute for a minimum number of processing cycles of the processor; and identify at least one replacement candidate store instruction that stores a value, wherein the value is not read by the frequently-executed region of code during execution of the initial profiling code.

In Example 2, the system further includes a runtime code generator to: generate optimized code for the frequently-executed region of code, where to generate the optimized code comprises to replace each of the at least one replacement candidate store instructions with a non-temporal store instruction; and cause the optimized code to execute instead of the frequently-executed region of code during subsequent runtime execution.

In Example 3, the profiler further is to: for each store instruction in the frequently-executed region of code, insert, into the initial profiling code, the store instruction and a first instruction to record information about the store instruction; and for each load instruction in the frequently-executed region of code, insert, into the initial profiling code, the load instruction and a second instruction to record information about the load instruction.

In Example 4, the runtime code generator is further to: cause the first instruction to execute to record information about the store instruction, where execution of the first instruction causes the computer to: generate a unique storage identifier for the store instruction; and record an association between the unique storage identifier for the store instruction and a storage address in which the store instruction stores data. The runtime code generator is further to: cause the second instruction to execute to record information about the load instruction, wherein execution of the second instruction causes the computer to: determine whether a previous store instruction accesses a load address from which the load instruction loads data; and if the previous store instruction accesses the load address, mark the unique storage identifier for the previous store instruction as a temporal store instruction.

In Example 5, the runtime code generator is further to: re-evaluate each store instruction of the frequently-executed region of code, and if the unique storage identifier for a respective store instruction is not marked as a temporal store instruction, identify the respective store instruction as a replacement candidate store instruction.

In Example 6, the runtime code generator is further to: identify at least one replacement candidate load instruction that loads a loaded value, where the loaded value is not loaded again or stored by the frequently-executed region of code during execution of the initial profiling code. To generate the optimized code further comprises to replace each of the at least one replacement candidate load instructions with a non-temporal load instruction.

In Example 7, execution of the second instruction is to: generate a unique load identifier for the load instruction; record an association between the unique load identifier for the load instruction and a load address from which the load instruction loads data; determine whether a previous store or load instruction has accessed the load address; and if the previous store or load instruction has accessed the load address, mark the unique load identifier for the load instruction as a temporal load instruction.

In Example 8, the runtime code generator is further to identify the at least one replacement candidate load instruction. The runtime code generator is to: re-evaluate each load instruction of the frequently-executed region of code; and if the unique load identifier for a respective load instruction is not marked as a temporal load instruction, identify the respective load instruction as a replacement candidate load instruction.

In Example 9, the runtime code generator is further to recommend replacement of each of the at least one replacement candidate store instructions with a non-temporal store instruction.

In Example 10, the runtime code generator is further to identify at least one replacement candidate load instruction that loads a loaded value, where the loaded value is not loaded again or stored by the frequently-executed region of code during execution of the initial profiling cede; and recommend replacement of each of the at least one replacement candidate load instructions with a non-temporal load instruction.

In Example 11, to identify at least one replacement candidate load instruction comprises to: determine whether a previous store or load instruction has accessed a load address from which data are loaded by the load instruction; if the previous store or load instruction accesses the load address, mark a unique load identifier for the load instruction as a temporal load instruction; re-evaluate each load instruction of the frequently-executed region of code; and if the unique load identifier for a respective load instruction is not marked as a temporal load instruction, identify the respective load instruction as a replacement candidate load instruction.

Note that the above processor can be implemented using various means. In an example, the processor comprises a system on a chip (SoC) incorporated in a user equipment touch-enabled device. In another example, a system comprises a display and a memory, and includes the processor of one or more of the above examples.

In Example 12, a method to identify and replace store and load instructions that will not benefit from caching includes identifying a frequently-executed region of code during runtime execution of the code; generating initial profiling code for the frequently-executed region of code; causing the initial profiling code to be executed for a minimum number of processing cycles of the computer; and identifying at least one replacement candidate store instruction that stores a stored value, wherein the stored value is not read by the frequently executed region of code during execution of the initial profiling code.

In Example 13, the method further includes generating optimized code for the frequently-executed region of code, where generating the optimized code comprises replacing each of the at least one replacement candidate store instructions with a non-temporal store instruction; and causing the optimized code to be executed instead of the frequently-executed region of code during subsequent runtime execution.

In Example 14, generating the initial profiling code for the frequently-executed region of code includes: for each store instruction in the frequently-executed region of code, inserting, into the initial profiling code, the store instruction and a first instruction to record information about the store instruction; and for each load instruction in the frequently-executed region of code, inserting, into the initial profiling code, the load instruction and a second instruction to record information about the load instruction.

In Example 15, causing the initial profiling code to execute includes causing the first instruction to execute to record information about the store instruction and causing the second instruction to execute to record information about the load instruction. Execution of the first instruction comprises: generating a unique storage identifier for the store instruction; and recording an association between the unique storage identifier for the store instruction and a storage address in which the store instruction stores data. Execution of the second instruction comprises determining whether a previous store instruction accesses a load address from which the load instruction loads data; and if the previous store instruction accesses the load address, marking the unique storage identifier for the previous store instruction as a temporal store instruction.

In Example 16, identifying at least one replacement candidate store instruction comprises re-evaluating each store instruction of the frequently-executed region of code; and if a unique storage identifier for a respective store instruction is not marked as a temporal store instruction, identifying the respective store instruction as a replacement candidate store instruction.

In Example 17, the method further includes identifying at least one replacement candidate load instruction that loads a loaded value, where the loaded value is not loaded again or stored by the frequently-executed region of code during execution of the initial profiling code. Generating the optimized code further comprises replacing each of the at least one replacement candidate load instructions with a non-temporal load instruction.

In Example 18, executing the second instruction comprises: generating a unique load identifier for the load instruction; recording an association between the unique load identifier for the load instruction and a load address from which the load instruction loads data; determining whether a previous store or load instruction has accessed the load address; and if the previous store or load instruction has accessed the load address, marking the unique load identifier for the load instruction as a temporal load instruction.

In Example 19, identifying at least one replacement candidate load instruction comprises re-evaluating each load instruction of the frequently-executed region of code; and if the unique load identifier for a respective load instruction is not marked as a temporal load instruction, identifying the respective load instruction as a replacement candidate load instruction.

In Example 20, the method of Example 1 further comprises recommending replacement of each of the at least one replacement candidate store instructions with a non-temporal store instruction.

In Example 21, the method further comprises: identifying at least one replacement candidate load instruction that loads a loaded value, wherein the loaded value is not loaded again or stored by the frequently-executed region of code during execution of the initial profiling code; and recommending replacement of each of the at least one replacement candidate load instructions with a non-temporal load instruction.

In Example 22, identifying at least one replacement candidate load instruction comprises: determining whether a previous store or load instruction has accessed a load address from which data are loaded by the load instruction; if the previous store or load instruction accesses the load address, marking a unique load identifier for the load instruction as a temporal load instruction; re-evaluating each load instruction of the frequently-executed region of code; and if the unique load identifier for a respective load instruction is not marked as a temporal load instruction, identifying the respective load instruction as a replacement candidate load instruction.

In another example, a computer-readable medium including instructions is to perform the method of any of the above examples. In another example, a computer-readable medium including data is to be used by at least one machine to fabricate at least one integrated circuit to perform the method of any one of the above examples.

In Example 23, a computer-readable medium includes instructions that, when executed, cause a computer to perform the methods of Examples 12-22.

In Example 24, an apparatus comprises means to perform the method of Examples 12-22.

In Example 25, an apparatus to identify and replace store and load instructions that will not benefit from caching includes means to identify a frequently-executed region of code during runtime execution of the code by the processor; means to generate initial profiling code for the frequently-executed region of code; means to cause the initial profiling code to execute for a minimum number of processing cycles of the processor; and means to identify at least one replacement candidate store instruction that stores a value, where the value is not read by, the frequently-executed region of code during execution of the initial profiling code.

In Example 26, the apparatus further includes means to generate optimized code for the frequently-executed region of code, where to generate the optimized code comprises to replace each of the at least one replacement candidate store instructions with a non-temporal store instruction; and means to cause the optimized code to execute instead of the frequently-executed region of code during subsequent runtime execution.

In Example 27, the means to generate initial profiling code further comprises: first means to insert, for each store instruction in the frequently-executed region of code, into the initial profiling code, the store instruction and a first instruction to record information about the store instruction; and second means to insert, for each load instruction in the frequently-executed region of code, into the initial profiling code, the load instruction and a second instruction to record information about the load instruction.

In Example 28, the apparatus further comprises: means to cause the first instruction to execute to record information about the store instruction; means to generate a unique storage identifier for the store instruction; means to record an association between the unique storage identifier for the store instruction and a storage address in which the store instruction stores data; means to cause the second instruction to execute to record information about the load instruction; means to determine whether a previous store instruction accesses a load address from which the load instruction loads data; and means to mark the unique storage identifier for the previous store instruction as a temporal store instruction if the previous store instruction accesses the load address.

In Example 29, the apparatus further includes means to re-evaluate each store instruction of the frequently-executed region of code; and means to identify the respective store instruction as a replacement candidate store instruction if the unique storage identifier for a respective store instruction is not marked as a temporal store instruction.

In Example 30, the apparatus further includes means to identify at least one replacement candidate load instruction that loads a loaded value, where the loaded value is not loaded again or stored by the frequently-executed region of code during execution of the initial profiling code. The means to generate the optimized code further comprises means to replace each of the at least one replacement candidate load instructions with a non-temporal load instruction.

In Example 31, the means to cause execution of the second instruction comprises: means to generate a unique load identifier for the load instruction; means to record an association between the unique load identifier for the load instruction and a load address from which the load instruction loads data; means to determine whether a previous store or load instruction has accessed the load address; and means to mark the unique load identifier for the load instruction as a temporal load instruction if the previous store or load instruction has accessed the load address.

In Example 32, the means to identify the at least one replacement candidate load instruction comprises: means to re-evaluate each load instruction of the frequently-executed region of code; and means to identify the respective load instruction as a replacement candidate load instruction if the unique load identifier for a respective load instruction is not marked as a temporal load instruction.

In Example 33, the apparatus of Example 22 further includes means to recommend replacement of each of the at least one replacement candidate store instructions with a non-temporal store instruction.

In Example 34, the apparatus further includes means to identify at least one replacement candidate load instruction that loads a loaded value, wherein the loaded value is not loaded again or stored by the frequently-executed region of code during execution of the initial profiling code; and means to recommend replacement of each of the at least one replacement candidate load instructions with a non-temporal load instruction.

In Example 35, the apparatus further includes means to determine whether a previous store or load instruction has accessed a load address from which data are loaded by the load instruction; means to mark a unique load identifier for the load instruction as a temporal load instruction if the previous store or load instruction accesses the load address; means to re-evaluate each load instruction of the frequently-executed region of code; and means to identify the respective load instruction as a replacement candidate load instruction if the unique load identifier for a respective load instruction is not marked as a temporal load instruction.

In another example, an apparatus comprises means for performing the method of any one of the above examples.

Understand that various combinations of the above Examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. At least one non-transitory computer-readable medium comprising instructions that, when executed by a processor, cause a computer to:
identify a frequently-executed region of code during runtime execution of the code;

generate initial profiling code for the frequently-executed region of code, to:
for each store instruction in the frequently-executed region of code, insert, into the initial profiling code, the store instruction and a first instruction to record information about the store instruction; and
for each load instruction in the frequently-executed region of code, insert, into the initial profiling code, the load instruction and a second instruction to record information about the load instruction;
cause the initial profiling code to be executed for a minimum number of processing cycles, to:
cause the first instruction to execute to record the information about the store instruction, wherein execution of the first instruction causes the computer to:
generate a unique storage identifier for the store instruction; and
record an association between the unique storage identifier for the store instruction and a storage address in which the store instruction stores data; and
cause the second instruction to execute to record the information about the load instruction, wherein execution of the second instruction causes the computer to:
determine whether a previous store instruction accesses a load address from which the load instruction loads data; and
if the previous store instruction accesses the load address, mark the unique storage identifier for the previous store instruction as a temporal store instruction; and
identify at least one replacement candidate store instruction that stores a stored value, wherein the stored value is not read by the frequently-executed region of code during execution of the initial profiling code.

2. The at least one non-transitory computer-readable medium of claim 1, wherein the instructions further cause the computer to:
generate optimized code for the frequently-executed region of code, wherein to generate the optimized code comprises to replace the at least one replacement candidate store instruction with a non-temporal store instruction; and
cause the optimized code to be executed instead of the frequently-executed region of code during subsequent runtime execution.

3. The at least one non-transitory computer-readable medium of claim 2, wherein the instructions further cause the computer to:
identify at least one replacement candidate load instruction that loads a loaded value, wherein the loaded value is not loaded again or stored by the frequently-executed region of code during execution of the initial profiling code, and wherein to generate the optimized code further comprises to replace the at least one replacement candidate load instruction with a non-temporal load instruction.

4. The at least one non-transitory computer-readable medium of claim 3, wherein execution of the second instruction further causes the computer to:
generate a unique load identifier for the load instruction;
record an association between the unique load identifier for the load instruction and a load address from which the load instruction loads data;
determine whether a previous store or load instruction has accessed the load address; and
if the previous store or load instruction has accessed the load address, mark the unique load identifier for the load instruction as a temporal load instruction.

5. The at least one non-transitory computer-readable medium of claim 4, wherein to identify at least one replacement candidate load instruction is to:
re-evaluate each load instruction of the frequently-executed region of code; and
if the unique load identifier for a respective load instruction is not marked as a temporal load instruction, identify the respective load instruction as a replacement candidate load instruction.

6. The at least one non-transitory computer-readable medium of claim 1, wherein to identify at least one replacement candidate store instruction is to:
re-evaluate each store instruction of the frequently-executed region of code; and
if a unique storage identifier for a respective store instruction is not marked as a temporal store instruction, identify the respective store instruction as a replacement candidate store instruction.

7. The at least one non-transitory computer-readable medium of claim 1, wherein the instructions further cause the computer to:
recommend replacement of the at least one replacement candidate store instruction with a non-temporal store instruction.

8. The at least one non-transitory computer-readable medium of claim 7, wherein the instructions further cause the computer to:
identify at least one replacement candidate load instruction that loads a loaded value, wherein the loaded value is not loaded again or stored by the frequently-executed region of code during execution of the initial profiling code; and
recommend replacement of the at least one replacement candidate load instructions with a non-temporal load instruction.

9. The at least one non-transitory computer-readable medium of claim 8, wherein to identify at least one replacement candidate load instruction comprises to:
determine whether a previous store or load instruction has accessed a load address from which data are loaded by the load instruction;
if the previous store or load instruction accesses the load address, mark a unique load identifier for the load instruction as a temporal load instruction;
re-evaluate each load instruction of the frequently-executed region of code; and
if the unique load identifier for a respective load instruction is not marked as a temporal load instruction, identify the respective load instruction as a replacement candidate load instruction.

10. A system comprising:
a processor;
a memory coupled to the processor;
a profiler to:
identify a frequently-executed region of code during runtime execution of the code by the processor;
generate initial profiling code for the frequently-executed region of code;
cause the initial profiling code to execute for a minimum number of processing cycles; and
identify at least one replacement candidate store instruction that stores a value, wherein the value is not read by the frequently-executed region of code during execution of the initial profiling code, wherein the profiler further is to:
for each store instruction in the frequently-executed region of code, insert, into the initial profiling code, the store instruction and a first instruction to record information about the store instruction; and
for each load instruction in the frequently-executed region of code, insert, into the initial profiling code, the load instruction and a second instruction to record information about the load instruction; and
a runtime code generator to:
generate optimized code for the frequently-executed region of code, wherein to generate the optimized code comprises to replace the at least one replacement candidate store instruction with a non-temporal store instruction; and
cause the optimized code to execute instead of the frequently-executed region of code during subsequent runtime execution, wherein the runtime code generator is further to:
cause the first instruction to execute to record the information about the store instruction, wherein execution of the first instruction causes the system to:
generate a unique storage identifier for the store instruction; and
record an association between the unique storage identifier for the store instruction and a storage address in which the store instruction stores data; and
cause the second instruction to execute to record the information about the load instruction, wherein execution of the second instruction causes the system to:
determine whether a previous store instruction accesses a load address from which the load instruction loads data; and
if the previous store instruction accesses the load address, mark the unique storage identifier for the previous store instruction as a temporal store instruction.

11. The system of claim 10, wherein the runtime code generator is further to:
re-evaluate each store instruction of the frequently-executed region of code; and
if the unique storage identifier for a respective store instruction is not marked as a temporal store instruction, identify the respective store instruction as a replacement candidate store instruction.

12. The system of claim 10, wherein the runtime code generator is further to:
identify at least one replacement candidate load instruction that loads a loaded value, wherein the loaded value is not loaded again or stored by the frequently-executed region of code during execution of the initial profiling code, and wherein to generate the optimized code further comprises to replace the at least one replacement candidate load instruction with a non-temporal load instruction.

13. The system of claim 12, wherein execution of the second instruction is to:
generate a unique load identifier for the load instruction;
record an association between the unique load identifier for the load instruction and a load address from which the load instruction loads data;
determine whether a previous store or load instruction has accessed the load address; and
if the previous store or load instruction has accessed the load address, mark the unique load identifier for the load instruction as a temporal load instruction.

14. The system of claim 13, wherein the runtime code generator is further to:
re-evaluate each load instruction of the frequently-executed region of code; and
if the unique load identifier for a respective load instruction is not marked as a temporal load instruction, identify the respective load instruction as a replacement candidate load instruction.

15. A method comprising:
identifying a frequently-executed region of code during runtime execution of the code;
generating initial profiling code for the frequently-executed region of code, wherein generating the initial profiling code for the frequently-executed region of code comprises:
for each store instruction in the frequently-executed region of code, inserting, into the initial profiling code, the store instruction and a first instruction to record information about the store instruction;
for each load instruction in the frequently-executed region of code, inserting, into the initial profiling code, the load instruction and a second instruction to record information about the load instruction;
causing the initial profiling code to be executed for a given number of iterations, wherein causing the initial profiling code to execute comprises:
causing the first instruction to execute to record the information about the store instruction, wherein execution of the first instruction comprises:
generating a unique storage identifier for the store instruction; and
recording an association between the unique storage identifier for the store instruction and a storage address in which the store instruction stores data; and
causing the second instruction to execute to record the information about the load instruction, wherein execution of the second instruction comprises:
determining whether a previous store instruction accesses a load address from which the load instruction loads data; and
if the previous store instruction accesses the load address, marking the unique storage identifier for the previous store instruction as a temporal store instruction;
identifying at least one replacement candidate store instruction that stores a stored value, wherein the stored value is not read by the frequently-executed region of code during execution of the initial profiling code;
generating optimized code for the frequently-executed region of code, wherein generating the optimized code comprises replacing the at least one replacement candidate store instruction with a non-temporal store instruction; and
causing the optimized code to be executed instead of the frequently-executed region of code during subsequent runtime execution.

16. The method of claim 15, wherein identifying at least one replacement candidate store instruction comprises:
re-evaluating each store instruction of the frequently-executed region of code; and if a unique storage identifier for a respective store instruction is not marked as a temporal store instruction, identifying the respective store instruction as a replacement candidate store instruction.

17. The method of claim 16, further comprising:
identifying at least one replacement candidate load instruction that loads a loaded value, wherein the loaded value is not loaded again or stored by the frequently-executed region of code during execution of the initial profiling code, and wherein generating the optimized code further comprises replacing the at least one replacement candidate load instruction with a non-temporal load instruction.

18. The method of claim 17, wherein executing the second instruction comprises:
generating a unique load identifier for the load instruction;
recording an association between the unique load identifier for the load instruction and a load address from which the load instruction loads data;
determining whether a previous store or load instruction has accessed the load address; and
if the previous store or load instruction has accessed the load address, marking the unique load identifier for the load instruction as a temporal load instruction.

19. The method of claim 18, wherein identifying at least one replacement candidate load instruction comprises:
re-evaluating each load instruction of the frequently-executed region of code; and
if the unique load identifier for a respective load instruction is not marked as a temporal load instruction, identifying the respective load instruction as a replacement candidate load instruction.

\* \* \* \* \*